United States Patent
Chandran et al.

(12) 
(10) Patent No.: US 11,256,030 B1
(45) Date of Patent: Feb. 22, 2022

(54) OPTICAL POWER SPLITTERS INCLUDING A NON-LINEAR WAVEGUIDE TAPER

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Sujith Chandran, Abu Dhabi (AE); Yusheng Bian, Ballston Lake, NY (US); Jaime Viegas, Abu Dhabi (AE); Ajey Poovannummoottil Jacob, Watervliet, NY (US)

(73) Assignees: GlobalFoundries U.S. Inc., Santa Clara, CA (US); Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 17/063,103

(22) Filed: Oct. 5, 2020

(51) Int. Cl.
  *G02B 6/122* (2006.01)
  *G02B 6/12* (2006.01)

(52) U.S. Cl.
  CPC ......... *G02B 6/1228* (2013.01); *G02B 6/1225* (2013.01); *G02B 2006/1213* (2013.01); *G02B 2006/12119* (2013.01); *G02B 2006/12147* (2013.01); *G02B 2006/12195* (2013.01)

(58) Field of Classification Search
  CPC .................................................. G02B 6/1228
  See application file for complete search history.

(56) References Cited

U.S. PATENT DOCUMENTS

| | | | |
|---|---|---|---|
| 6,792,172 B1* | 9/2004 | Levy .................... | G02B 6/2813 385/15 |
| 2006/0204175 A1* | 9/2006 | Laurent-Lund ........ | G02B 6/136 385/43 |

FOREIGN PATENT DOCUMENTS

| | | | | |
|---|---|---|---|---|
| CN | 106896446 A | * | 6/2017 | |
| WO | WO-2004008207 A1 | * | 1/2004 | ............. G02B 6/125 |

OTHER PUBLICATIONS

Mu, X.; Wu, S.; Cheng, L.; Fu, H., "Edge Couplers in Silicon Photonic Integrated Circuits: A Review", Published Feb. 24, 2020, Appl. Sci. 10, 1538.

(Continued)

*Primary Examiner* — Charlie Y Peng
(74) *Attorney, Agent, or Firm* — Thompson Hine LLP; Anthony Canale

(57) ABSTRACT

Structures for an optical power splitter and methods of forming a structure for an optical power splitter. A first waveguide core provides an input port, and second and third waveguide cores provide respective output ports. A non-linear waveguide taper is coupled to the first waveguide core at a first interface and is coupled to the second and third waveguide cores at a second interface. The non-linear waveguide taper includes a first curved section having a first width dimension that increases with increasing longitudinal distance from the first interface. The non-linear waveguide taper includes a second curved section having a second width dimension that increases with increasing longitudinal distance from the second interface. The first and second curved sections join at a longitudinal location at which the first and second width dimensions are each equal to a maximum width of the non-linear waveguide taper.

20 Claims, 4 Drawing Sheets

(56) References Cited

OTHER PUBLICATIONS

Jacob et al., "Waveguide Crossings Having Arms Shaped With a Non-Linear Curvature" filed Oct. 25, 2019 as U.S. Appl. No. 16/663,696.
Tao, et al., "Cascade wide-angle Y-junction 1 × 16 optical power splitter based on silicon wire waveguides on silicon-on-insulator," Opt. Express 16, 21456-21461 (2008).
Sakai et al., "Low Loss Ultra-Small Branches in a Silicon Photonic Wire Waveguide" IEICE Transactions on Electronics, vol. E85-C, No. 4, pp. 1033-1038, Publication Date: Apr. 1, 2002.
Xiao et al., "Ultra-compact low loss polarization insensitive silicon waveguide splitter," Opt. Express 21, 16331-16336 (2013).
Z. Sheng et al., "A Compact and Low-Loss MMI Coupler Fabricated With CMOS Technology," in IEEE Photonics Journal, vol. 4, No. 6, pp. 2272-2277, Dec. 2012, doi: 10.1109/JPHOT.2012.2230320.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
Zhang, et al., "A compact and low loss Y-junction for submicron silicon waveguide," Opt. Express 21, 1310-1316 (2013).

\* cited by examiner

OPTICAL POWER SPLITTERS INCLUDING A NON-LINEAR WAVEGUIDE TAPER

BACKGROUND

The present invention relates to photonics chips and, more specifically, to structures for an optical power splitter and methods of forming a structure for an optical power splitter.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An optical power splitter is an optical component that is commonly used in photonics chips to divide optical power between multiple waveguides with a desired coupling ratio. The same structure may be used as an optical power combiner that combines optical power received from multiple waveguides. Conventional optical power splitter/combiners tend to have a footprint that is larger than desirable and, in addition, may exhibit an insertion loss that is higher than desirable.

Improved structures for an optical power splitter and methods of forming a structure for an optical power splitter are needed.

SUMMARY

In an embodiment of the invention, a structure for an optical power splitter is provided. The structure includes a first waveguide core providing an input port to the optical power splitter, a second waveguide core providing a first output port from the optical power splitter, a third waveguide core providing a second output port from the optical power splitter, and a non-linear waveguide taper that is coupled to the first waveguide core at a first interface and that is coupled to the second waveguide core and the third waveguide core at a second interface. The non-linear waveguide taper includes a longitudinal axis, a first curved section, and a second curved section. The first curved section has a first width dimension that increases with increasing distance along the longitudinal axis from the first interface. The second curved section has a second width dimension that increases with increasing distance along the longitudinal axis from the second interface. The first curved section is joined to the second curved section at a location along the longitudinal axis at which the first width dimension and the second width dimension are each equal to a maximum width of the non-linear waveguide taper.

In an embodiment of the invention, a method of forming a structure for an optical power splitter is provided. The method includes forming a first waveguide core providing an input port to the optical power splitter, forming a second waveguide core providing a first output port from the optical power splitter, forming a third waveguide core providing a second output port from the optical power splitter, and forming a non-linear waveguide taper that is coupled to the first waveguide core at a first interface and that is coupled to the second waveguide core and the third waveguide core at a second interface. The non-linear waveguide taper includes a longitudinal axis, a first curved section, and a second curved section. The first curved section has a first width dimension that increases with increasing distance along the longitudinal axis from the first interface. The second curved section has a second width dimension that increases with increasing distance along the longitudinal axis from the second interface. The first curved section is joined to the second curved section at a location along the longitudinal axis at which the first width dimension and the second width dimension are each equal to a maximum width of the non-linear waveguide taper.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
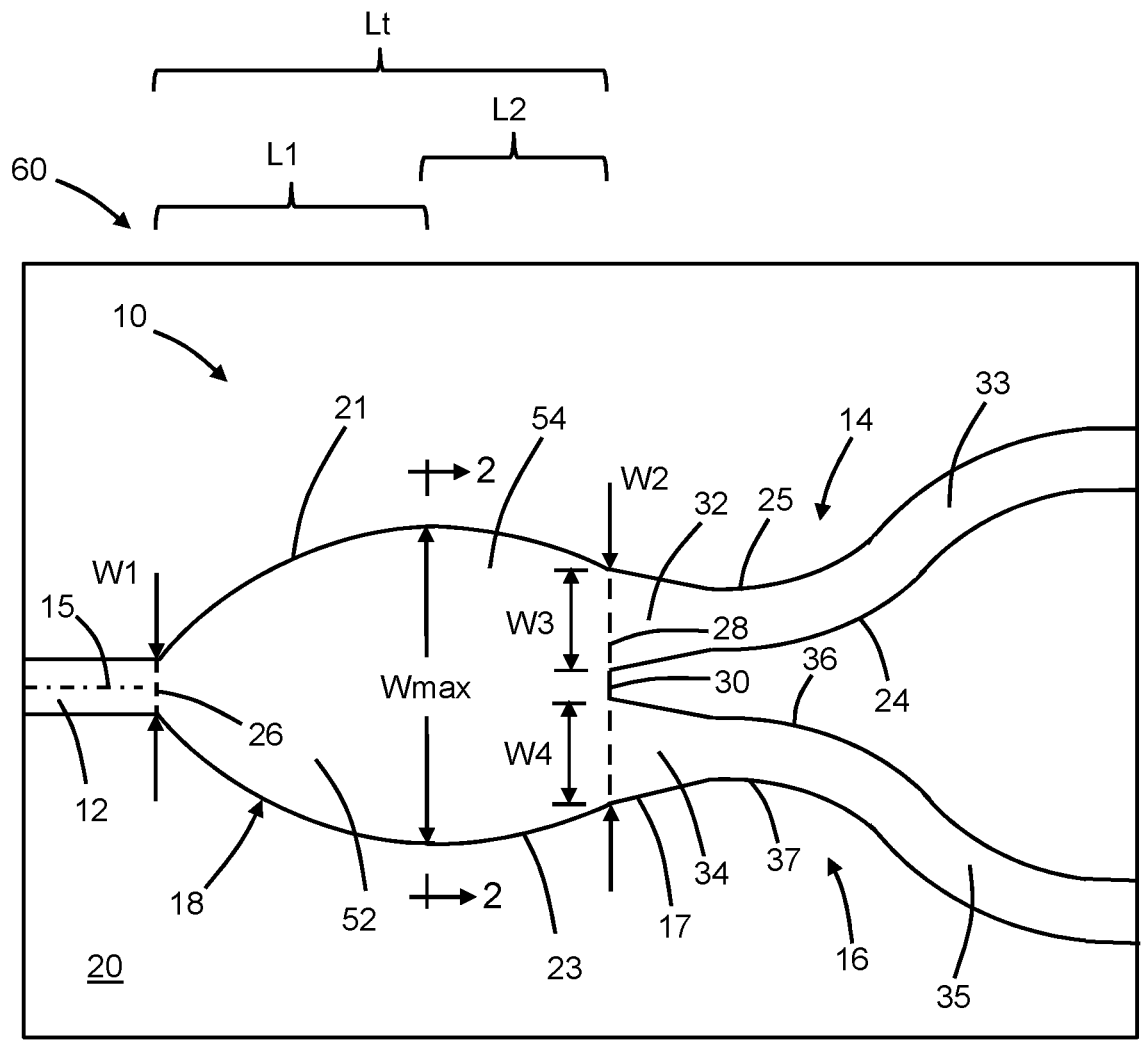
FIG. 1 is a diagrammatic top view of a structure at an initial fabrication stage of a processing method in accordance with embodiments of the invention.
Figure 2:
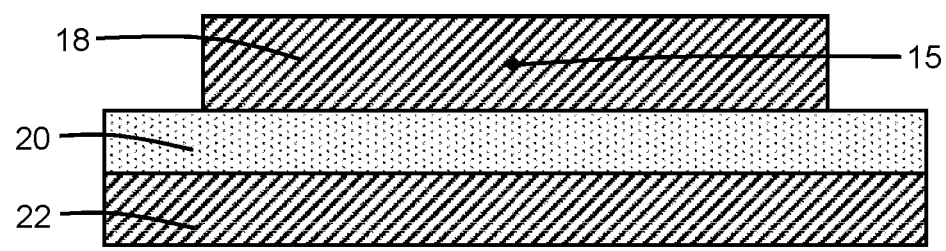
FIG. 2 is a cross-sectional view taken generally along line 2-2 in FIG. 1.

With reference to FIGS. 1, 2 and in accordance with embodiments of the invention, a structure 10 for an optical power splitter includes a waveguide core 12, a waveguide core 14, a waveguide core 16, and a non-linear waveguide taper 18 that couples the waveguide core 12 to the waveguide cores 14, 16. The waveguide core 12 provides an input port of the structure 10 and the waveguide cores 14, 16 provide output ports of the structure 10 defining a Y-shaped junction. The waveguide cores 12, 14, 16 and non-linear waveguide taper 18 are positioned over and on a dielectric layer 20. The non-linear waveguide taper 18 may define a multimode interference region of the structure 10 that provides the optical power splitting.

The waveguide cores 12, 14, 16 and non-linear waveguide taper 18 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 20 and a handle substrate 22 comprised of a single-crystal semiconductor material, such as single-crystal silicon. The waveguide cores 12, 14, 16 and non-linear waveguide taper 18 may be patterned from the device layer by lithography and etching processes. The device layer may be fully etched to define the waveguide cores 12, 14, 16 and non-linear waveguide taper 18 or, alternatively, only partially etched to define a thinned residual layer or slab on the dielectric layer 20 coupled to lower portions of the waveguide cores 12, 14, 16 and non-linear waveguide taper 18. The waveguide cores 12, 14, 16 and non-linear waveguide taper 18 may have coplanar or substantially coplanar top and bottom surfaces, as well as a uniform or substantially uniform thickness and a rectangular or substantially rectangular shape.

The non-linear waveguide taper 18 has opposite sidewalls or side surfaces 21, 23, an interface 26 at which the waveguide core 12 is coupled, and an interface 28 at which both of the waveguide cores 14, 16 are coupled. The interfaces 26, 28 are diagrammatically indicated by respective dashed lines in FIG. 1. The non-linear waveguide taper 18 and the waveguide core 12 are arranged along a longitudinal axis 15 that intersects both of the interfaces 26, 28. The waveguide cores 14, 16 are laterally offset from the longitudinal axis 15 in opposite horizontal directions. The waveguide cores 14, 16 are separated from each other by a sidewall or side surface 30 of the non-linear waveguide taper 18 at the interface 28.

The waveguide core 14 includes a taper 32 that couples the waveguide core 14 to a portion of the interface 28 with the non-linear waveguide taper 18. The taper 32 narrows in width with increasing distance from the coupled portion of the interface 28. In an embodiment, the taper 32 may narrow in width as described by a linear function. The taper 32 of the waveguide core 14 is further coupled to bends 33 that increase the lateral separation of the waveguide core 14 relative to the waveguide core 16 downstream from the non-linear waveguide taper 18. The taper 32 is positioned along the length of the waveguide core 14 between the bends 33 and the interface 28.

The waveguide core 16 includes a taper 34 that couples the waveguide core 16 to a portion of the interface 28 with the non-linear waveguide taper 18. The taper 34 narrows in width with increasing distance from the interface 28. In an embodiment, the taper 34 may narrow in width as described by a linear function. The taper 34 of the waveguide core 16 is further coupled to bends 35 that increase the lateral separation of the waveguide core 16 relative to the waveguide core 14 downstream from the non-linear waveguide taper 18. The taper 34 is positioned along the length of the waveguide core 16 between the bends 35 and the interface 28.

The side surface 30 of the non-linear waveguide taper 18 is arranged at the interface 28 between the portion of the interface 28 to which the taper 32 of the waveguide core 14 is coupled and the portion of the interface 28 to which the taper 34 of the waveguide core 16 is coupled. The waveguide core 14 has a side surface 24 and a side surface 25 opposite to the side surface 24. The waveguide core 16 has a side surface 36 and a side surface 37 opposite to the side surface 36. The side surface 25 of the waveguide core 14 may be connected to, and continuous with, the side surface 21 of the non-linear waveguide taper 18. The side surface 37 of the waveguide core 16 may be connected to, and continuous with, the side surface 23 of the non-linear waveguide taper 18.

The side surface 30 is positioned between, and connects, the side surface 24 with the side surface 36 at the interface 28. The side surface 30 defines a non-zero gap between the respective intersections of the waveguide cores 14, 16 at the interface 28 with the different portions of the non-linear waveguide taper 18. The absence of an intersection between the side surfaces 24, 36 defines the non-zero gap between the side surfaces 24, 36 at the interface 28. The side surfaces 24, 36 converge to intersect the opposite ends of the side surface 30 and are spaced apart by the non-zero gap at the respective locations of intersection.

The non-linear waveguide taper 18 has a width dimension that varies along the longitudinal axis from a width, W1, at the interface 26 with the waveguide core 12 to a width, W2, at the interface 28 with the waveguide cores 14, 16. The width dimension of the non-linear waveguide taper 18 has a maximum width, Wmax, that is located along the longitudinal axis 15 between the interface 26 and the interface 28. The maximum width, Wmax, is greater than the width, W1, at the interface 26 and is also greater than the width, W2, at the interface 28. The width dimension of the non-linear waveguide taper 18 continuously increases from the width, W1, at the interface 26 to the maximum width, Wmax. Similarly, the width dimension of the non-linear waveguide taper 18 also continuously increases from the width, W2, at the interface 28 to the maximum width, Wmax.

The width, W2, at the interface 28 with the waveguide cores 14, 16 includes the width, W3, of the taper 32 at the interface 28, the width, W4, of the taper 34 at the interface 28, and the width of the side surface 30. The width of the side surface 30 is equal to the difference between the width, W2, and the sum of the widths W3 and W4. The non-zero gap has a width equal to the width of the side surface 30.

The non-linear waveguide taper 18 extends along a total length, Lt, along the longitudinal axis 15 between the interface 26 and the interface 28. The non-linear waveguide taper 18 has a curved section 52 positioned along the longitudinal axis 15 between the interface 26 and the location of the maximum width, Wmax, and a curved section 54 positioned along the longitudinal axis 15 between the interface 28 and the location of the maximum width, Wmax. The curved section 52 has a width dimension that increases from the width, W1, to the width, Wmax, with increasing distance along the longitudinal axis 15 from the interface 26. The curved section 54 has a width dimension that increases from the width, W2, to the width, Wmax, with increasing distance along the longitudinal axis 15 from the interface 28. The curved sections 52, 54 are joined (i.e., converge) at a location along the longitudinal axis 15 at which their respective width dimensions are each equal to the maximum width, Wmax, of the non-linear waveguide taper 18.

The total length, Lt, is divided into a length, L1, of the curved section 52 between the location of the maximum width, Wmax, and the interface 26 and a length, L2, of the curved section 54 between the location of the maximum width, Wmax, and the interface 28. In an embodiment for which the width, W1, at the interface 26 and the width, W2, at the interface 28 are unequal, the location of the maximum width, Wmax, is asymmetrically positioned between the interface 26 and the interface 28. For example, if the width, W1, is less than the width, W2, then the value of the length, L1 is greater than the value of the length, L2, such that the location of the maximum width, Wmax, is closer to the interface 28 than to the interface 26. The curved section 52 is curved over its entire length, L1, and the curved section 54 is also curved over its entire length, L2.

The curved shape of the non-linear waveguide taper 18 has an envelope at its side surfaces 21, 23 with a curvature at each of its side surfaces 21, 23 that may be described by a non-linear function. In an embodiment, the curved shape of the non-linear waveguide taper 18 has an envelope at its side surfaces 21, 23 with a curvature at each of its side surfaces 21, 23 that may be described by a cosine function. Specifically, the width of the curved shape for the non-linear waveguide taper 18 as a function of position, x, along the longitudinal axis 15 may be given by $W(x)=W_{max} \cdot \cos[\pi x/(2L0)]$ wherein L0 is the position along the longitudinal axis 15 that the cosine curve crosses the longitudinal axis 15 (i.e., W(L0)=0). The maximum width, Wmax, of the curvature occurs at x=0.

Given a set of widths, W1, W2, Wmax, values may be calculated for the lengths L1 and L2 of the different curved sections 52, 54 of the non-linear waveguide taper 18. The length, L1, is dependent on a ratio of the width, W1, to the width, Wmax, and the length, L2, is dependent on a ratio of the width, W2, to the width, Wmax. Specifically, the absolute value of L1 is equal to $(2L0/\pi)\cdot\arccos(W1/Wmax)$, and the absolute value of L2 is equal to $(2L0/\pi)\cdot\arccos(W2/Wmax)$. The total length, Lt, of the non-linear waveguide taper 18 between the interfaces 26, 28 is equal to the sum of L1 and the sum of L2.

In an alternative embodiment, the width of the curved shape of the non-linear waveguide taper 18 as a function of position along the longitudinal axis 15 may be described by a sine function $W(x)=Wmax\cdot\sin[\pi x/(2L0)]$ defining the curvature of the envelope. In an alternative embodiment, the width of the curved shape of the non-linear waveguide taper 18 as a function of position along the longitudinal axis 15 may be described by an exponential function.

The optical power splitter has a compact footprint due to the non-linear curved tapering of the non-linear waveguide taper 18. The optical power splitter may be characterized by low insertion loss, low cross-talk, low reflection, and low wavelength dependence also due to the non-linear curved tapering of the non-linear waveguide taper 18.

Figure 3:
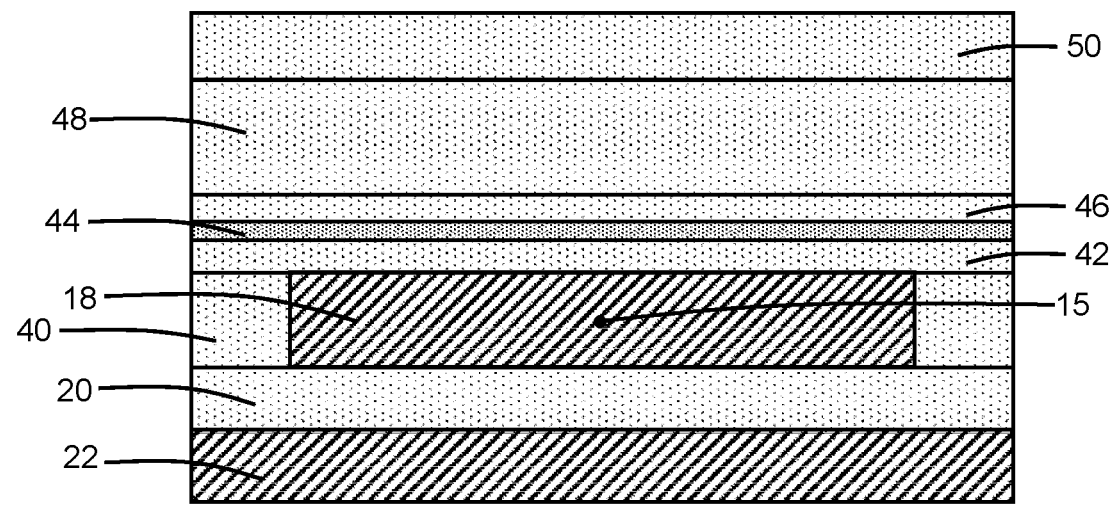
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage, dielectric layers 40, 42, 44, 46 comprised of respective dielectric materials may be sequentially formed in a layer stack over the waveguide cores 12, 14, 16 and non-linear waveguide taper 18. In the layer stack, the dielectric layer 40 is arranged over the dielectric layer 20, the waveguide cores 12, 14, 16 and non-linear waveguide taper 18, the dielectric layer 42 is arranged over the dielectric layer 40, the dielectric layer 44 is arranged over the dielectric layer 42, and the dielectric layer 46 is arranged over the dielectric layer 44. The waveguide cores 12, 14, 16 and non-linear waveguide taper 18 are embedded or buried in the dielectric material of the dielectric layers 40, 42, which act as low-index cladding.

The dielectric layer 40 may be comprised of a dielectric material, such as silicon dioxide, deposited by chemical vapor deposition and planarized with, for example, chemical mechanical polishing to remove topography. The dielectric layer 42 may be comprised of dielectric material, such as silicon dioxide, deposited by chemical vapor deposition or atomic layer deposition over the dielectric layer 40. The dielectric layer 44 may be comprised of dielectric material, such as silicon nitride, deposited by chemical vapor deposition or atomic layer deposition over the dielectric layer 42. The dielectric layer 46 may be comprised of dielectric material, such as silicon dioxide, deposited by chemical vapor deposition or atomic layer deposition over the dielectric layer 44. The dielectric layers 42, 44, 46 may be planar layers arranged in the layer stack over the planarized top surface of the dielectric layer 40.

A dielectric layer 48 of a contact level is formed by middle-of-line processing over the dielectric layer 46. The dielectric layer 48 may be comprised of dielectric material, such as silicon dioxide, deposited by chemical vapor deposition using ozone and tetraethylorthosilicate (TEOS) as reactants.

A back-end-of-line stack, generally indicated by reference numeral 50, may be formed by back-end-of-line processing over the dielectric layer 48. The back-end-of-line stack 50 may include one or more interlayer dielectric layers comprised of one or more dielectric materials, such as a silicon dioxide, and metallization comprised of, for example, copper and/or tungsten, that is arranged in the one or more interlayer dielectric layers.

In an alternative embodiment, the dielectric layers 40, 42, 44, 46, 48 and back-end-of-line stack 50 may be omitted such that the upper cladding is air. In an alternative embodiment, the upper cladding may only include the dielectric layers 40, 42.

The structure 10, in any of its embodiments described herein, may be integrated into a photonics chip 60 (FIG. 1) that may include electronic components and optical components in addition to the waveguide cores 12, 14, 16 and non-linear waveguide taper 18. The electronic components may include, for example, field-effect transistors that are fabricated by CMOS front-end-of-line (FEOL) processing using the device layer of the SOI wafer.

In use, laser light may be guided on the photonics chip 60 by the waveguide core 12 from, for example, a fiber coupler or a laser coupler to the structure 10. The laser light is transferred by the non-linear waveguide taper 18 in a distributed manner to the waveguide cores 14, 16. The optical power of the laser light is divided or split by the structure 10 into one fraction or percentage that is transferred from the waveguide core 12 to the waveguide core 14 and another fraction or percentage that is transferred from the waveguide core 12 to the waveguide core 16. The laser light may be split equally (i.e., a coupling ratio of 50%:50%) or split substantially equally (i.e., a coupling ratio of approximately 50%:50%) if the waveguide cores 14, 16 are symmetrically arranged with respect to the waveguide core 12. Alternatively, the coupling ratio may be customized to differ from an equal or substantially equal split by asymmetrically arranging the waveguide cores 14, 16 with respect to the waveguide core 12. The waveguide core 14 and the waveguide core 16 separately guide the split laser light away from the structure 10. The spacing between the waveguide cores 14, 16 increases downstream from the structure 10 to eliminate interaction and crosstalk. Alternatively, the structure 10 may be used to combine the optical power of laser light received from the waveguide cores 14, 16 for output by the waveguide core 12 to, for example, a photodetector or a modulator.

Figure 4:
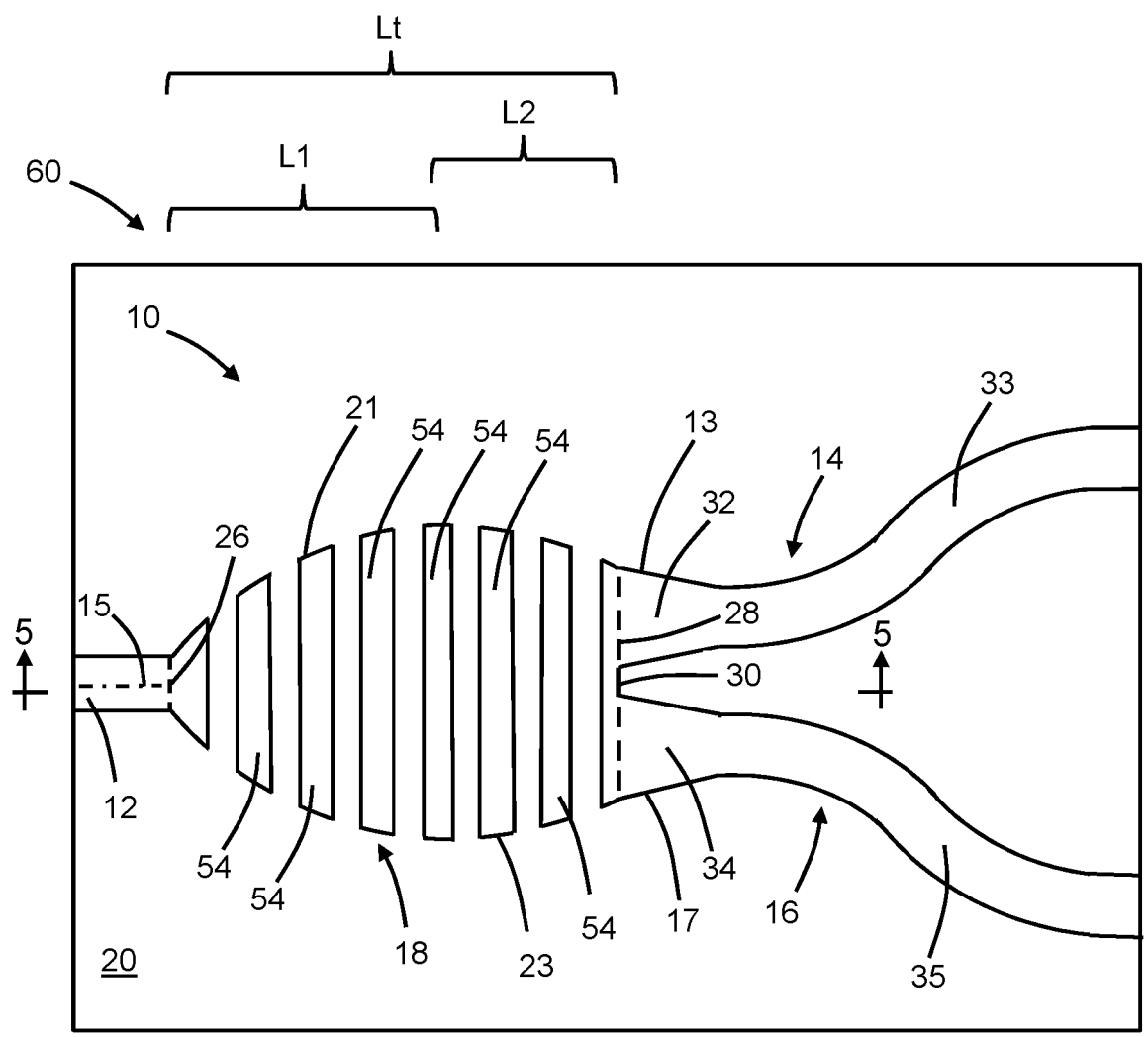
FIG. 4 is a diagrammatic top view of a structure in accordance with embodiments of the invention.
Figure 5:
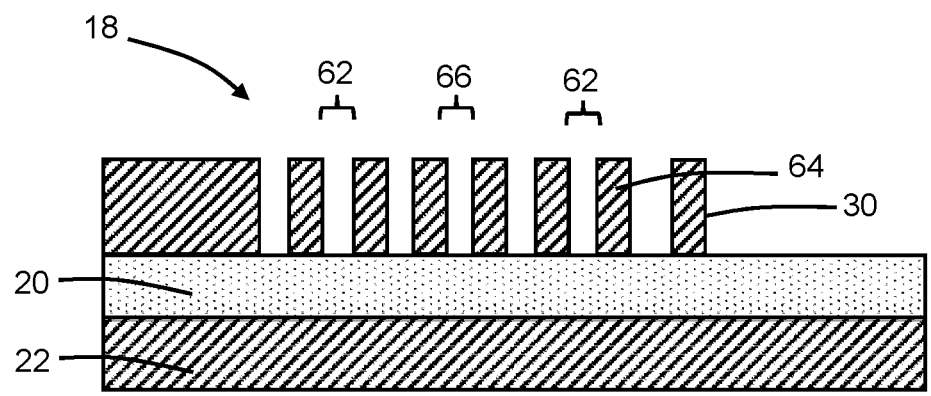
FIG. 5 is a cross-sectional view taken generally along line 5-5 in FIG. 4.

With reference to FIGS. 4, 5 and in accordance with alternative embodiments of the invention, the non-linear waveguide taper 18 may be divided into segments 64 that are laterally spaced with a given pitch and with gaps 62 between adjacent segments 64. The segments 64 have individual lengths that conform to the envelope such that the curvature of the non-linear waveguide taper 18 is maintained. The segments 64 may be defined during the lithography and etching processes forming the waveguide cores 12, 14, 16 and the non-linear waveguide taper 18. In an alternative embodiment, the layer of single-crystal semiconductor material in the gaps 62 may be only partially etched to define a thinned residual layer or slab on the dielectric layer 20 and connecting lower portions of the segments 64. The gaps 62 extend fully across the width dimension of the non-linear waveguide taper 18 and through both of the opposite side surfaces 21, 23.

The segments 64 of the non-linear waveguide taper 18 may be characterized by optical properties (e.g., refractive index) that differ from bulk optical properties, commonly referred to as a metamaterial. In an embodiment, the pitch of the segments 64 may be less than the wavelength of the laser light being optically split by the structure 10.

Figure 6:
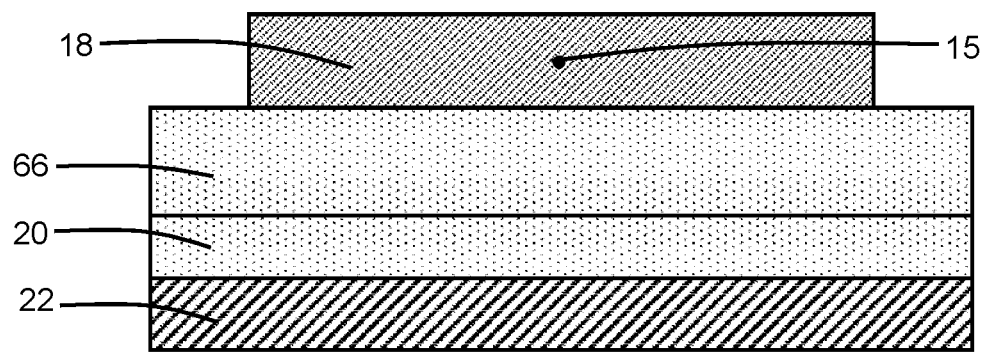
FIG. 6 is a cross-sectional view of a structure in accordance with alternative embodiments of the invention.

With reference to FIG. 6 and in accordance with alternative embodiments of the invention, the waveguide cores 12, 14, 16 and the non-linear waveguide taper 18 of the optical power splitter may be comprised of a different material. In an embodiment, the waveguide cores 12, 14, 16 and the non-linear waveguide taper 18 may be comprised of a dielectric material, such as silicon nitride, and may be positioned on a dielectric layer 66 that is deposited on the dielectric layer 20. The dielectric layer 66 may comprise, for example, silicon dioxide. The waveguide cores 12, 14, 16 and the non-linear waveguide taper 18 may be formed by depositing a layer of the constituent material on the dielectric layer 66, and patterning the deposited layer with lithography and etching processes that include forming an etch mask over the deposited layer and etching the masked deposited layer with an etching process, such as reactive ion etching. In an embodiment, the non-linear waveguide taper 18 may include smooth continuous side surfaces 21, 23 as described in connection with FIGS. 1, 2. In an embodiment, the non-linear waveguide taper 18 may be segmented as described in connection with FIGS. 4, 6. In alternative embodiments, other material systems of high/low-index contrast, such as III-V compound semiconductors like indium phosphide, germanium-on-silicon, and silica-on-silicon may be used to form the splitter.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power splitter, the structure comprising:
   a first waveguide core providing an input port to the optical power splitter;
   a second waveguide core providing a first output port from the optical power splitter;
   a third waveguide core providing a second output port from the optical power splitter; and
   a non-linear waveguide taper coupled to the first waveguide core at a first interface and coupled to the second waveguide core and the third waveguide core at a second interface, the non-linear waveguide taper including a longitudinal axis, a first curved section, and a second curved section, the first curved section having a first width dimension that increases with increasing distance along the longitudinal axis from the first interface, the second curved section having a second width dimension that increases with increasing distance along the longitudinal axis from the second interface, and the first curved section joined to the second curved section at a location along the longitudinal axis at which the first width dimension and the second width dimension are each equal to a maximum width of the non-linear waveguide taper,
   wherein the non-linear waveguide taper has a first side surface and a second side surface opposite to the first side surface, the first side surface and the second side surface each extend from the first interface to the second interface, and the first side surface and the second side surface each have a curvature defined by an exponential function.

2. The structure of claim 1 wherein the first width dimension is equal to a first width at the first interface, the second width dimension is equal to a second width at the second interface, and the first width differs from the second width.

3. The structure of claim 2 wherein the first width is less than the second width.

4. The structure of claim 2 wherein the first waveguide core has a width dimension equal to the first width at the first interface with the non-linear waveguide taper.

5. The structure of claim 2 wherein the first width and the second width are unequal, and the maximum width is asymmetrically located along the longitudinal axis relative to the first interface and the second interface.

6. The structure of claim 2 wherein the first curved section of the non-linear waveguide taper has a first length that is dependent on a first ratio of the first width to the maximum width, and the second curved section of the non-linear waveguide taper has a second length that is dependent on a second ratio of the second width to the maximum width.

7. The structure of claim 1 wherein the maximum width is located along the longitudinal axis closer to the second interface than to the first interface.

8. The structure of claim 1 wherein the first waveguide core, the second waveguide core, the third waveguide core, and the non-linear waveguide taper comprise single-crystal silicon.

9. A structure for an optical power splitter, the structure comprising:
- a first waveguide core providing an input port to the optical power splitter;
- a second waveguide core providing a first output port from the optical power splitter;
- a third waveguide core providing a second output port from the optical power splitter; and
- a non-linear waveguide taper coupled to the first waveguide core at a first interface and coupled to the second waveguide core and the third waveguide core at a second interface, the non-linear waveguide taper including a longitudinal axis, a first curved section, and a second curved section, the first curved section having a first width dimension that increases with increasing distance along the longitudinal axis from the first interface, the second curved section having a second width dimension that increases with increasing distance along the longitudinal axis from the second interface, and the first curved section joined to the second curved section at a location along the longitudinal axis at which the first width dimension and the second width dimension are each equal to a maximum width of the non-linear waveguide taper,
- wherein the non-linear waveguide taper includes a plurality of segments that are spaced apart along the longitudinal axis between the first interface and the second interface, the non-linear waveguide taper has a first side surface and a second side surface, and the plurality of segments are separated by a plurality of gaps that extend fully across the non-linear waveguide taper and through the first side surface and the second side surface.

10. The structure of claim 9 wherein the first width dimension is equal to a first width at the first interface, the second width dimension is equal to a second width at the second interface, and the first width differs from the second width.

11. The structure of claim 10 wherein the first width is less than the second width.

12. The structure of claim 10 wherein the first waveguide core has a width dimension equal to the first width at the first interface with the non-linear waveguide taper.

13. The structure of claim 10 wherein the first width and the second width are unequal, and the maximum width is asymmetrically located along the longitudinal axis relative to the first interface and the second interface.

14. The structure of claim 10 wherein the first curved section of the non-linear waveguide taper has a first length that is dependent on a first ratio of the first width to the maximum width, and the second curved section of the non-linear waveguide taper has a second length that is dependent on a second ratio of the second width to the maximum width.

15. The structure of claim 9 wherein the maximum width is located along the longitudinal axis closer to the second interface than to the first interface.

16. The structure of claim 9 wherein the first side surface and the second side surface each have a curvature defined by an exponential function.

17. The structure of claim 9 wherein the first waveguide core, the second waveguide core, the third waveguide core, and the non-linear waveguide taper comprise single-crystal silicon.

18. A structure for an optical power splitter, the structure comprising:
- a first waveguide core providing an input port to the optical power splitter;
- a second waveguide core providing a first output port from the optical power splitter;
- a third waveguide core providing a second output port from the optical power splitter; and
- a non-linear waveguide taper coupled to the first waveguide core at a first interface and coupled to the second waveguide core and the third waveguide core at a second interface, the non-linear waveguide taper including a longitudinal axis, a first curved section, and a second curved section, the first curved section having a first width dimension that increases with increasing distance along the longitudinal axis from the first interface, the second curved section having a second width dimension that increases with increasing distance along the longitudinal axis from the second interface, and the first curved section joined to the second curved section at a location along the longitudinal axis at which the first width dimension and the second width dimension are each equal to a maximum width of the non-linear waveguide taper,
- wherein the second waveguide core is coupled to a first portion of the second interface, the third waveguide core is coupled to a second portion of the second interface, the non-linear waveguide taper includes a side surface at the second interface that is arranged between the first portion of the second interface and the second portion of the second interface, the second waveguide core includes a first taper that couples the second waveguide core to the first portion of the second interface, and the third waveguide core includes a second taper that couples the third waveguide core to the second portion of the second interface.

19. The structure of claim 18 wherein the side surface of the non-linear waveguide taper is arranged at the second interface between the first taper and the second taper.

20. The structure of claim 19 wherein the side surface of the non-linear waveguide taper is aligned along the longitudinal axis with the first waveguide core at the first interface.

* * * * *